United States Patent [19]

Spears

[11] 4,150,542
[45] Apr. 24, 1979

[54] FLUID TRANSMISSION UNIT AND BRAKING SYSTEM

[76] Inventor: Marvin C. Spears, Knoxville, Tenn.

[21] Appl. No.: 842,570

[22] Filed: Oct. 17, 1977

[51] Int. Cl.² ............................................. F16D 33/00
[52] U.S. Cl. ...................... 60/330; 60/494; 417/177
[58] Field of Search ............... 60/325, 327, 330, 331, 60/332, 333, 334, 494; 416/176, 177

[56] References Cited

U.S. PATENT DOCUMENTS

| | | | |
|---|---|---|---|
| 280,247 | 6/1883 | See .......................................... | 60/494 |
| 2,133,135 | 10/1938 | Doran .................................. | 60/494 X |
| 2,357,654 | 9/1944 | Horton ................................... | 60/332 |
| 2,389,174 | 11/1945 | Whitworth ............................ | 60/332 |
| 3,209,874 | 10/1965 | Foster et al. .......................... | 60/330 |
| 3,955,365 | 5/1976 | Arao ....................................... | 60/330 |

Primary Examiner—Edgar W. Geoghegan
Attorney, Agent, or Firm—Harry R. Dumont

[57] ABSTRACT

A fluid drive transmission in which a moving fluid is used to connect the drive and driven members together. The drive and driven members both comprise rollers having longitudinally mounted, spiral shaped vanes extending about their periphery. The rollers are mounted in end to end spaced relationship in a common housing with a greater radial spacing provided between the periphery of the driving member and the housing than between the periphery of the driven member and housing. The system further includes a combined apparatus for supplemental braking which includes a valve connected in a closed hydraulic path between the ends of the housing. The valve is effective to retard the pressurized flow of the fluid upon application of the brakes thus assisting in slowing down the speed of operation of the transmission and retarding the drive output.

11 Claims, 5 Drawing Figures

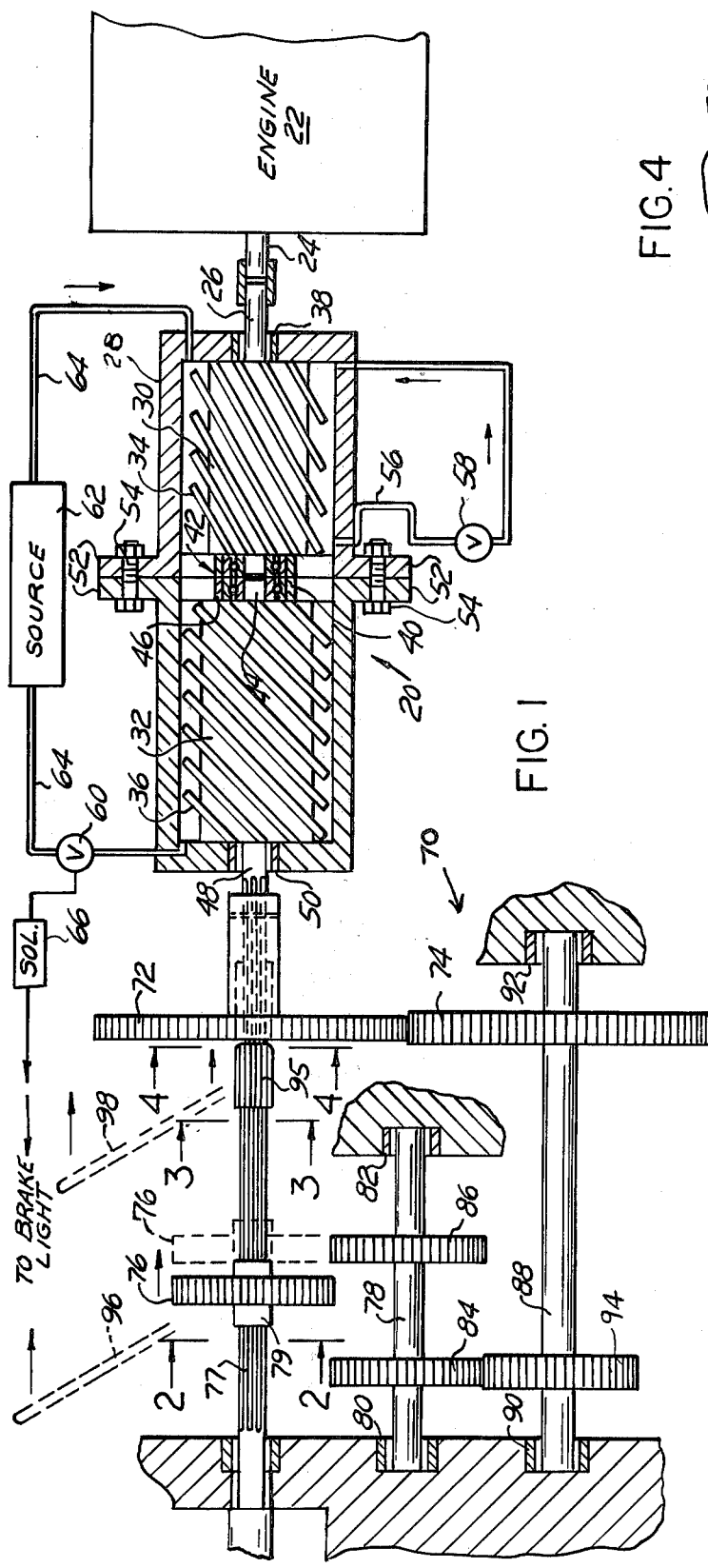
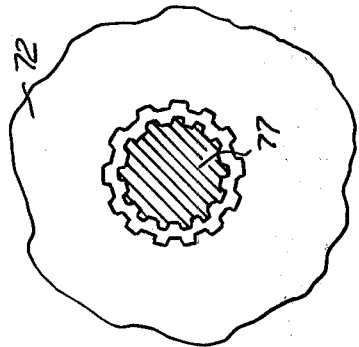
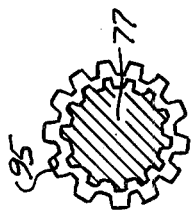
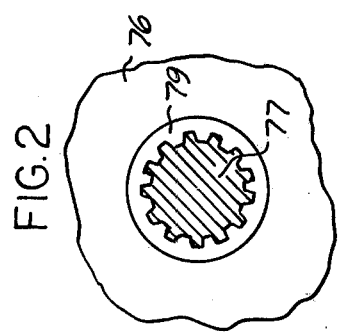

FLUID TRANSMISSION UNIT AND BRAKING SYSTEM

BACKGROUND OF THE INVENTION

The present invention is related to a relatively simple fluid drive transmission which is self contained and does away with the necessity of providing a clutch between the originating source of power such as the engine and the drive and driven members. It further eliminates the necessity of using a gear shift mechanism and gear trains except when changeover into reverse operation is desired. The fluid circulation is a continuous one and the fluid moves through a closed path while transmitting power from the drive to the driven member. A variety of fluid coupled power transmission units are known to the prior art with a number of different arrangements of vanes on the drive and driven members of the unit. One example of such a fluid transmission unit is disclosed in U.S. Pat. No. 2,389,174 issued on Nov. 20, 1945 to P. V. Withworth for "Power Transmitting Unit". The drive and driven units generally used in the prior art include cup shaped members placed in opposition on either the drive or driven member. A different type of fluid coupling device is shown in U.S. Pat. No. 3,955,365 issued on Apr. 28, 1975, to Masachika Arao for "Fluid Coupled Drive Apparatus". In that patent there is shown a different and well known arrangement whereby the fluid coupling is through a pair of opposed disc like members which have arranged about their inner surface a number of vanes.

A still further type of fluid-mechanical power transmission is shown in U.S. Pat. No. 3,209,874 issued on Oct. 5, 1965, to G. Foster et. al. for "Fluid-Mechanical Power Transmission System". That patent uses a drive and driven member having flat surfaces opposed one to the other with the driven member carrying a number of radial vanes.

A still further type of fluid transmission system is shown and described in U.S. Pat. No. 2,357,654 issued on Sept. 5, 1944 to J. R. Horton for "Turbo Power Transmission Apparatus". That patent shows a system in which a number of variable pitch vanes are included that are shifted mechanically to vary the pitch of the blades.

SUMMARY OF THE INVENTION

In the apparatus of the present invention, the front roller or drive roller rotatably drives the rear or driven roller through its own rotation. The spiral type vanes mounted about the periphery of the two rollers provide a movement of fluid and the resultant rotation of the driven or rear roller. Since there is provided a space between the housing and the front roller greater than that between the housing and the rear roller, the fluid output from the drive roller can have a much greater volume than the rear roller can handle without rotating more rapidly. A pressure relief valve is provided in a conduit connected across the drive roller so that if there is excessive pressure build up it can break and return the fluid flow to the front of the front roller. An additional significant feature included in the system is an associated braking system which retards the flow of fluid between the two ends of the housing and which provides slowdown of fluid flow which thereby saves wear on the brakes. This feature may be incorporated along with the fluid drive transmission according to my invention or along with a single stage drive member functioning along with the engine drive shaft as will be better explained in the accompanying section "Description of Operation".

BRIEF DESCRIPTION OF THE DRAWINGS

The present invention will be described in the light of the accompanying drawings in which like numerals refer to corresponding parts appearing in the different drawings and in which:

FIG. 1 is a partly sectional, partly schematic showing of the invention;

FIGS. 2, 3, and 4 are sectional views taken through the showing of the drawing of FIG. 1 along lines as illustrated.

DETAILED DESCRIPTION OF THE PREFERRED EMBODIMENT

Figure 5:
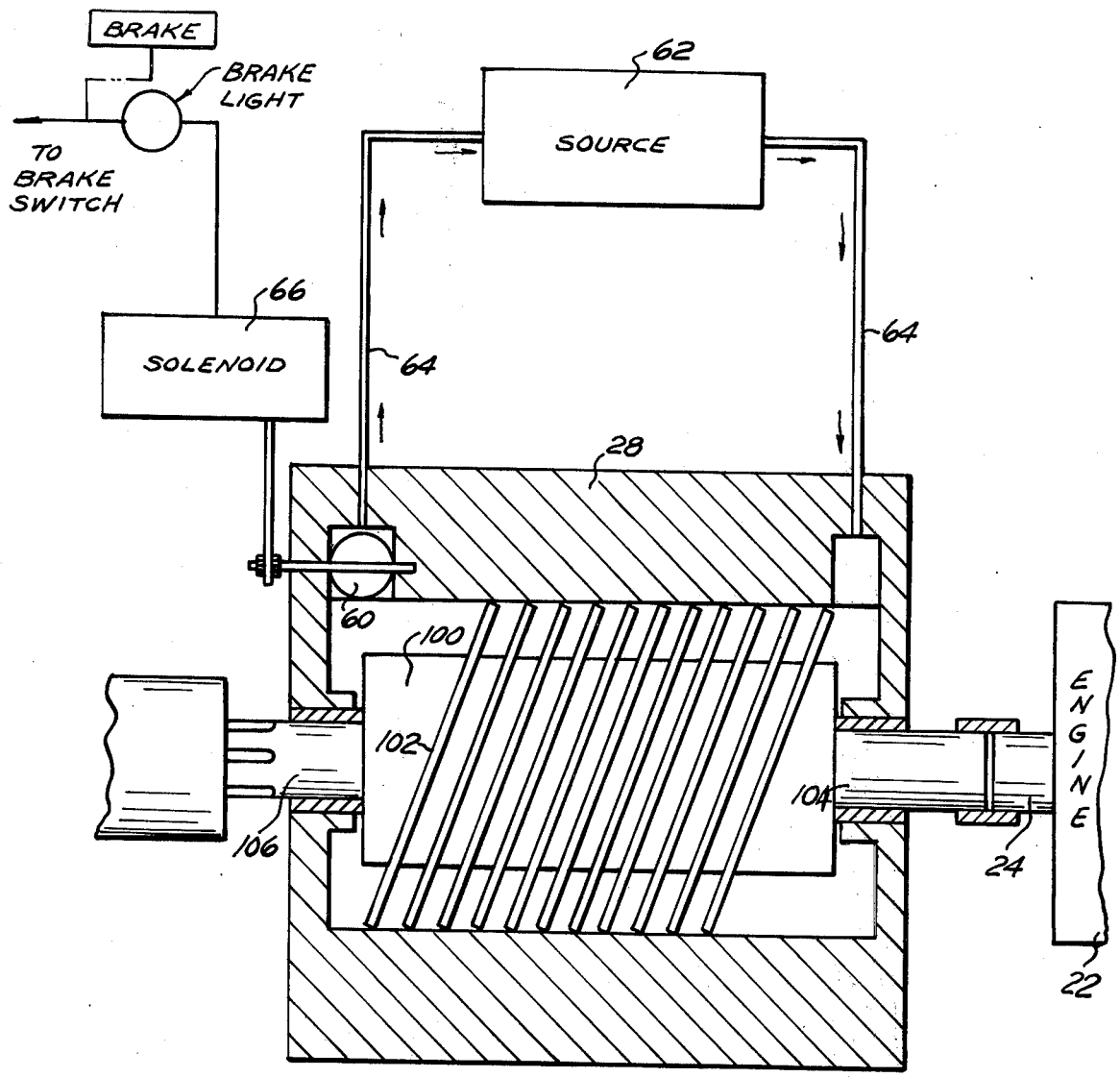
FIG. 5 is a partly sectional, partly schematic drawing of a showing of a different embodiment of the braking system provided.

The fluid drive transmission according to my invention is indicated generally by the numeral 20. The power input through the transmission 20 is from a prime mover such as engine 22. The output shaft 24 from the engine 22 is connected to a shaft 26 to receive the rotative drive from the engine 22.

The main operating parts of the transmission 20 include an elongated housing 28, a front or drive roller 30, and a rear or driven roller 32. Both rollers 30 and 32 are mounted end to end for rotation, one independently of the other. A spiral type vane 34 is mounted about the periphery of the roller 30 while a similar spiral vane 36 is mounted above the periphery of the driven roller 32. The drive roller 30 has extending from it the shaft 26 which is rotatably mounted on a bearing 38. The central shaft 40, at the left hand end of the drive roller 30, is rotatably supported in a ball bearing 42. In a like manner, the shaft 44 extending from the right hand end of the driven roller 32 is rotatably retained in a roller bearing 46 as illustrated. The left hand end of the roller 32 has a shaft 48 extending leftwardly from it and likewise retained by a bearing 50.

The housing 28 of the drive transmission 20 will be seen to be formed longitudinally in two halves which are coupled together by flanges 52 and spaced bolts 54. The longitudinal right hand portion of the housing 28 has an internal diameter somewhat smaller than the left hand portion so that there is provided a greater clearance between the periphery of the drive roller 30 and the interior of the housing 28 than exists between the periphery of the driven roller 32 and the inner surface of the housing 28. The importance of this will be explained in the section hereinafter entitled "Description of Operation".

Also shown in the upper portion of FIG. 1 is the hydraulic circuit which controls the flow of fluid for the transmission and includes the braking part of the system. At the lower right hand portion of the transmission 20 there is shown a conduit 56 with its left hand end in communication with the interior of the housing 28 proximate the left hand end of the roller 30 while the right hand end of the conduit 56 is in communication with the interior of the housing 28 proximate the right hand end of the roller 30. A valve 58 is included in the circuit of the conduit 56 as shown. The valve 58 is a pressure relief valve and, if there is excessive pressure buildup on take-off between the right and left hand ends of the roller 30, the valve 58 will open and return the fluid back away from the rear of the roller 30. As the speed of rotation of the driven roller 32 increases, the pressure buildup is relieved, the pressure relief valve 58 will close and all the fluid will be passed through the housing 28 past the rear roller 32. Thus the rear roller 32 is permitted to turn much more rapidly than the front roller 30.

The second hydraulic circuit related to the braking function is included in FIG. 1 which includes a valve 60, a pressurized fluid source 62, and a conduit 64 communicating at its left end with the interior of the housing 28 proximate the rear or driven roller 32 and communicating at its right end at the front end of the drive roller 30. In this hydraulic stage, the valve 60 is operated by a solenoid 66. The solenoid 66 in turn is electrically energized by one of the mechanical or electrical elements controlled by depression of the brake pedal for example, by the brake switch and the electrical circuit including the brake light. Therefore, in a manner well known in the art, an electrical operating potential can be supplied by the electrical system to operate the solenoid 66 when the brakes are applied. Once the solenoid 66 is operated, it will close and turn off the return through the valve 60. The valve 60 may be embodied as a butterfly type flow control valve. The closure of the valve 60 will serve to retard the flow of fluid through the housing 28 thus directly slowing down the output of the transmission and slowing down the vehicle itself. This saves wear on the brakes and provides more rapid and safer stops. To provide for reverse operation of the vehicle, a reversing mechanism is included as is generally denoted by the numeral 70. It will be noted that the only gears required in the fluid transmission are those which are needed for providing a reverse operation. The basic parts of the gear reversing system 70 are a driven gear 72 and a cluster gear 74 normally in mesh with it. A reverse slider gear 76 is mounted on a collar 79 which is internally splined and slidable on output shaft 77. The shaft 77 has an external spline configuration as shown. It will be understood that the left hand end of the shaft 77 terminates in a differential mechanism such as is well known in the art and is used to drive the drive wheels of the vehicle.

The additional operating parts in the reversing gear system 70 include a stub shaft 78 rotatably mounted between bearings 80 and 82. Fixed to the shaft 78 are a pair of gears 84, 86. A further stub shaft 88 is rotatably mounted between spaced bearings 90 and 92 and carries on it a gear 94. In the forward drive position illustrated it will be seen that the shaft 77 is being rotated in the same direction as the shaft 24 which receives its input from the prime mover or engine 22. In its reverse operation, the shaft 77 will be rotated in the opposite direction from the shaft 24. Changeover between forward to reverse operation is provided through the operation of the shift levers 96 and 98 which are moved in the direction of the arrows associated with them to provide a changeover into the reverse operation. The detailed manner in which this changeover is provided will be further explained in the section "Description of Operation" hereinafter.

FIG. 5 shows a somewhat simplified and different embodiment of the invention and particularly an alternate to the supplemental braking system already shown in FIG. 1. In the system of FIG. 5 the fluid pump brake is associated with a single stage roller and vane combination which includes a roller 100 with a spiral type vane 102 extending along the greater part of its periphery. The right hand end of the roller 100 terminates in a shaft 104 adapted to be connected to the drive shaft 24 from a prime mover or engine 22. The left hand end of the roller 100 terminates in a shaft 106 which is adapted to be connected through intermediate mechanisms, not shown, to provide a rotative drive, for example to the wheels of a vehicle. In the interest of brevity and simplification the associated detail with reversing mechanism, as shown in FIG. 1, is not being repeated. In the braking system of FIG. 5, the source 62 in a like manner to FIG. 1 is in hydraulic circuit with a conduit 64 communicating between the left hand and right hand ends of the housing 28. It will be seen that the normal path of flow of fluid is through the conduit as illustrated by the arrows. A butterfly type valve 60 is electrically operated again through a solenoid 66 responsive to the actuation of a brake pedal with an electrical control signal being derived, for example, from a circuit associated with the brake light. Responsive to the energization of the solenoid 66 the valve 60 can be closed. With the drive system in normal operation, there will be a continuous rotation of the roller 100 and a pressure differential will exist between the right and left hand ends of the housing 28. This will cause a continuous flow of fluid through the conduit 64. When the brake light goes on, the valve 60 will be closed and with the flow of fluid retarded, a braking effect and slow down will occur.

DESCRIPTION OF OPERATION

Upon start up of the engine 22, the shaft 24 will rotate along with the drive roller 30 at a gradually accelerating rate. The space or clearance between the inside surface of the housing 28 and the drive roller 30 is greater than the space between the inside surface of the housing 28 and the driven roller 32. Accordingly, a greater volume of pressurized fluid will result than can be handled by the driven roller 32 without turning faster than drive roller 30. If on start up the pressure buildup is too great, the pressure relief valve 58 will be opened and feed-back of fluid through the conduit 56 toward the front end of the drive roller 30 will result. When the driven roller 32 starts rotating and the vehicle begins to move, the pressure will drop, the valve 58 will again close, and all of the fluid will flow in driving relationship with the driven roller 32 and its vanes 36. From this point on, the vehicle can change speeds on the highway and the rear roller 32 can rotate much more rapidly than the drive roller 30. All this may be achieved without going through gear trains or a gear shift mechanism.

In the event a stop is desired, the brakes will be applied to the vehicle. The brake light will then be illuminated providing an energizing potential to the solenoid 66 which will then partially close the butterfly valve 60 and slow fluid return from the left hand end of the housing 28. This retarding of the flow of fluid will tend to immediately slow down the rotation of the driven roller 32 and also apply a braking force to the movement of the vehicle.

The operation of the reversing mechanism 70 occurs when a manual shift is made of the levers 96, 98. Movement of the lever 96 will shift collar 79 and gear 76 in a rightward direction to place the teeth of the gear 76 into mesh with those of the reverse idler gear 86. At the same time, the collar 95 will be moved rightwardly by lever 98 to fill the space between the shaft 77 and the internal teeth of the gear 72. The collar 95 has both inner and outer spline teeth. Thus a reverse direction drive is transmitted through the gears 76, 86, 84, 94, 74 and 72 to the output shaft 77 and finally to the driven wheels of the vehicle.

It will thus be seen that I have provided by my invention an exceedingly simple but efficient fluid drive transmission and one which is readily combinable with a further novel supplemental braking system during the operation of the vehicle. Due attention should be given to the pitch of the vane 34 on the drive roller 30 as compared to the pitch of the vane 36 on the driven roller 32. In the exemplary embodiment of FIG. 1, the pitch from the horizontal of the vane 36 is approximately 45° while that of the vane 34 is about 30° to the horizontal. These relatively different pitches further allow driving of the driven roller 32 at a much faster rate than the drive roller 30.

I claim:

1. A fluid drive transmission for a vehicle, comprising: a fluid filled housing; a drive roller and a driven roller endwise spaced one from the other and rotatably mounted inside said housing, each of said rollers having a spiral type vane mounted about its longitudinal periphery; said drive roller having a greater spacing intermediate its periphery and the inside surface of said housing than said driven roller.

2. The combination as set forth in claim 1 wherein a conduit is connected intermediate the ends of said housing and wherein a pressure relief valve is further mounted in said conduit for restricting fluid flow therethrough responsive to excessive pressure buildup during startup.

3. The combination as set forth in claim 1 wherein the drive roller is of smaller diameter than said driven roller.

4. The combination as set forth in claim 1 wherein a further conduit is mounted having one end in communication with the end of said housing proximate a forward end of said drive roller and the other end in communication with the end of said housing proximate a rearward end of said driven roller; and a valve mounted in said conduit for retarding fluid return to the forward end of the drive roller responsive to actuation of a braking means of said vehicle.

5. The combination as set forth in claim 4 wherein said braking means includes a warning light associated with it and said valve is operably connected with a solenoid in circuit with said light for partially closing said valve.

6. The combination as set forth in claim 1 wherein the spiral type vane of said drive roller is at an angle substantially 30° to the horizontal and wherein the spiral type vane of said driven roller is at an angle of substantially 45° to the horizontal.

7. The combination as set forth in claim 1 wherein an output shaft operably connected to said driven roller has connected thereto a manipulative reversing means for changing the direction of the rotation of said shaft.

8. A fluid pump brake system for a vehicle, comprising: a rotatably driven output shaft; a roller mounted on said output shaft and having a spiral vane mounted along its external length; a pressurized fluid filled housing enclosing said roller; a conduit communicating between the two ends of the housing; and a valve operably mounted in said conduit for restricting fluid flow therethrough and thus controlling the rate of rotation of said roller and shaft and the speed of said vehicle.

9. The combination as set forth in claim 8 wherein a source of pressurized fluid is connected in said conduit.

10. The combination as set forth in claim 9 wherein said valve is electrically operated responsive to brake actuation of said vehicle.

11. The combination as set forth in claim 10 wherein said valve in said conduit comprises a butterfly type valve, and a solenoid is coupled to said valve for operating it.

* * * * *